United States Patent [19]

Kraetsch et al.

[11] Patent Number: 4,896,937

[45] Date of Patent: Jan. 30, 1990

[54] OPTICAL FIBER SWITCH

[75] Inventors: Richard T. Kraetsch, Berkeley Heights; Richard J. Pimpinella, Hampton; Leonard W. Schaper; King L. Tai, both of Berkeley Heights, all of N.J.

[73] Assignee: American Telephone and Telegraph Company, AT&T Bell Laboratories, Murray Hill, N.J.

[21] Appl. No.: 227,220

[22] Filed: Aug. 2, 1988

[51] Int. Cl.[4] ............................................. G02B 6/36
[52] U.S. Cl. ............................... 350/96.20; 350/96.21
[58] Field of Search ............... 350/96.20, 96.21, 96.22, 350/96.15

[56] References Cited

U.S. PATENT DOCUMENTS

| 4,152,043 | 5/1979 | Albanese | 350/96.20 |
|---|---|---|---|
| 4,189,206 | 2/1980 | Terai et al. | 350/96.20 |
| 4,223,978 | 9/1980 | Kummer et al. | 350/96.20 |
| 4,312,561 | 1/1982 | Mead | 350/96.21 |
| 4,636,032 | 1/1987 | Grego | 350/96.20 |
| 4,662,713 | 5/1987 | Davies et al. | 350/96.20 |
| 4,662,962 | 5/1987 | Malavielle | 156/158 |
| 4,688,885 | 8/1987 | Poteat et al. | 350/96.20 |
| 4,725,114 | 2/1988 | Murphy | 350/96.17 |
| 4,778,243 | 10/1988 | Finzel | 350/96.21 |

OTHER PUBLICATIONS

"Fiber-Optic Switch", *IBM Technical Disclosure Bulletin*, Apr. 1979, vol. 21, No. 11, p. 4686, J. D. Crow.

*Primary Examiner*—Frank Gonzalez
*Attorney, Agent, or Firm*—Jerry W. Herndon

[57] ABSTRACT

A precisely aligned optical fiber switch assembly. A base member has a vee groove for supporting a fixed optical fiber and a second optical fiber in optical alignment with the fixed fiber. The groove contains sections of different dimensions that receive and align sheathed portions of the fibers and groove sections that receive and align unsheathed portions of the fibers. First aligning means on the base member longitudinally position the fixed and second fibers in the groove. Covering means mate with the base member for covering at least part of the sheathed portions of the fibers. Aligning means position the covering means precisely with respect to the base member.

17 Claims, 3 Drawing Sheets

OPTICAL FIBER SWITCH

TECHNICAL FIELD

The invention relates generally to the field of optics and particularly to optical fiber switching by means of a device arranged for precise alignment of input and output optical fibers and preferably operated by electromagnetic means.

BACKGROUND OF THE INVENTION

A number of different designs of optical fiber switches are known. A typical form of such a switch is a single pole-double throw in which one fiber is physically moved into optical connection with one of two other fibers in response to some form of stimulus. Other forms, such as single pole-single throw or double pole-double throw, are also common. One problem in the design of optical fiber switches is optical alignment of the individual fibers that are optically connected. And because the fibers are fragile, a second problem concerns maintaining structural integrity of the fibers despite the fact that the switch operates by physical movement of the fibers.

Some designs use elaborate structures to solve the alignment problem. In U.S. Pat. No. 4,189,206, for example, an optical fiber is guided into a slit formed between two contact poles and through a guide hole formed by two bars traversely attached to one end of the contact poles.

The alignment problem has been partially solved by the use of grooves in which the fibers reside in the switch housing. The use of grooves of different shapes is illustrated in U.S. Pat. No. 4,152,043 to A. Albanese entitled "Electrostatic Optical Switch With Electrical Connection to Coated Optical Fiber". The use of vee-shaped grooves, such as shown in FIG. 5 of the patent, is particularly helpful for alignment purposes. The use of vee grooves is also shown in *IBM Technical Disclosure Bulletin,* Vol. 21, No. 11, April, 1979 in an article by J. D. Crow. The devices described by Albanese and Crow are electrostatically operated and thus require large voltages to achieve physical movement of the fiber. In addition, these and other embodiments appear to completely expose the glass fiber inside the switch housing. Because of movement of the fibers and problems of strain relief of the fibers, such embodiments appear to be structurally weak.

SUMMARY OF THE INVENTION

An optical fiber switch assembly comprises a base member having a groove extending longitudinally from one side of the base member to the opposite side. The groove supports a fixed optical fiber on one side of the base member and a second optical fiber on its opposite side in optical alignment with the fixed fiber. The second fiber is switchable in a plane perpendicular to the base member. The section of the groove that supports the fixed fiber and the section of the groove that supports the second fiber each contains a first groove portion that receives and aligns a sheathed portion of its respective fiber and a second groove portion that receives and aligns an unsheathed end portion of a fiber. First aligning means on the base member longitudinally positions the fixed and switchable fibers in the groove in the base member. Covering means mate with the base member for covering at least part of the sheathed portions of the fibers. Aligning means position the covering means precisely with respect to the base member. Means are provided for operating the switchable fiber in its switching plane.

In a preferred embodiment, the covering means includes a first covering member for covering at least part of the sheathed portion of the switchable fiber where it enters the assembly and a second covering member for covering at least part of the sheathed portion of the fixed fiber where it enters the assembly. The second covering member further includes a longitudinal groove that receives and aligns a second fixed fiber for optical connection with the switchable fiber when it is in a switched state. The aligning means comprises a recess in the mating surfaces of the base member and the covering means for accepting a ball bearing which resides partially in both recesses. Other aligning means longitudinally position the second fixed fiber in the groove in the second covering member. Glue secures part of the sheathed portions of the fibers into their respective grooves. Glue stops, which are larger sections of the grooves, halt the flow of glue to prevent interference with the movable portion of the switchable fiber and ends of the fibers where optical connection is made. An aligning groove runs parallel to the optical fiber grooves in the mating surfaces of the base member and the covering means and accepts an aligning fiber partly in the base member and partly in the covering means.

Ferromagnetic material is located on the switchable fiber in proximity to its switchable end. A ferromagnetic member is located on the covering means in partial overlapping configuration with the ferromagnetic material on the switchable fiber. Current applied to a coil surrounding the base member and the covering means creates a magnetic field which interacts with the magnetic material to operate the switch. A permanent magnet on the underside of the base member interacts with the magnetic material on the switchable fiber to assist lock-in alignment of the switchable fiber with one of the fixed fibers when the switchable fiber is released to its nonswitched state. The permanent magnet further reduces bounce of the switchable and therefore reduces switching time.

DETAILED DESCRIPTION

Figure 1:
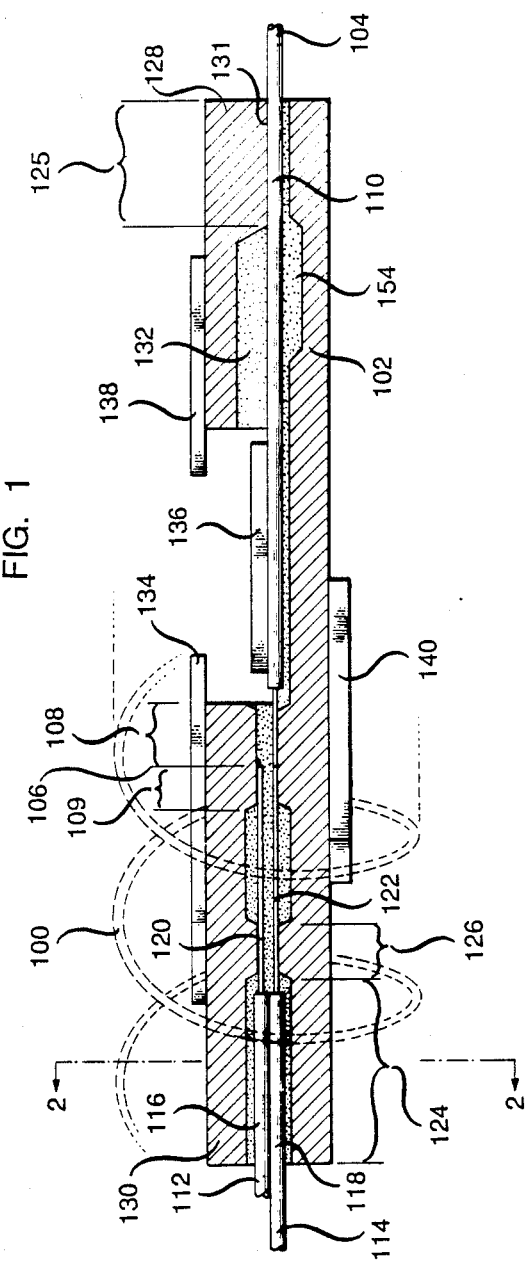
FIG. 1 shows a side view of the internal elements of a preferred embodiment of the switch assembly and a conceptual illustration of a magnetic coil surrounding the internal switch elements.
Figure 2:
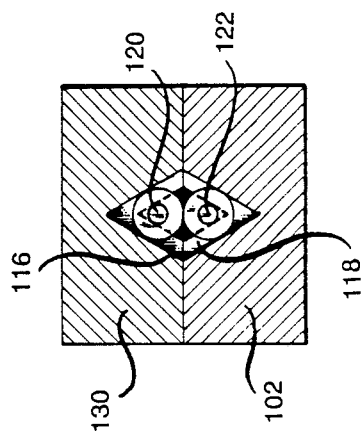
FIG. 2 shows a simplified cross-sectional view of the assembly taken at 2—2 of FIG. 1 illustrating a preferred embodiment in which multidimensional vee grooves for supporting sheathed fiber are responsible for high strain relief of the fibers and, in part, the precision alignment of the fibers.
Figure 3:
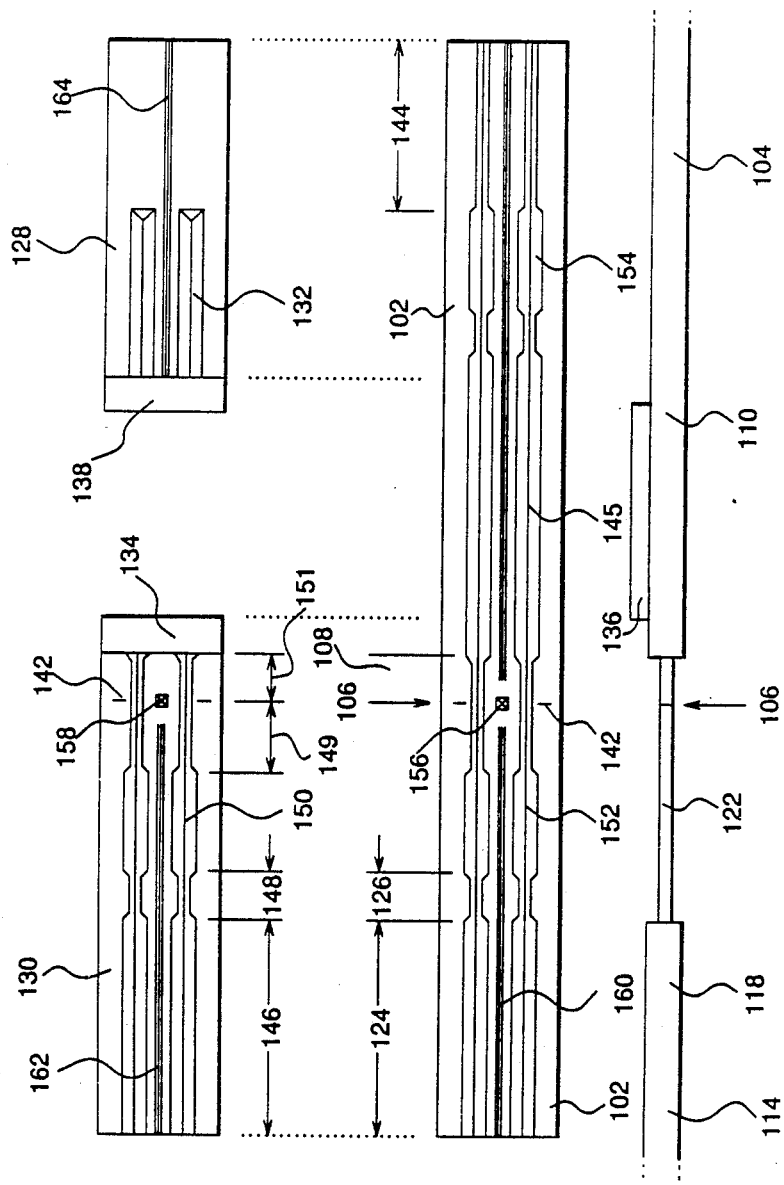
FIG. 3 shows the internal structure of a base member and covering members of the assembly, including multidimensional vee grooves for supporting an aligning sheathed and unsheathed portions of the fibers and for acting as glue stops; a fixed and a switchable fiber is placed aside the base member as an aid to visualization of placement of the fibers into the members.

The reader should refer to FIGS. 1 through 3 during the following description. For convenience, the same designation numbers are used in each of the figures when referring to the same element. A side view of the internal elements of the switch assembly is shown in FIG. 1. FIG. 2 shows a cross-sectional view of the assembly taken at 2—2 of FIG. 1. FIG. 3 shows the internal construction of a base member 102 and cover members 128 and 130. The preferred assembly is a double pole-double throw switch, although clearly this is not a limitation of the invention. FIG. 3 illustrates this preferred embodiment by showing two sets of internal grooves in base and cover members 102, 128 and 130. Only a single set of grooves and fibers for a single switch are shown in FIG. 2 for simplicity. In the following discussion, reference is made only to a single switch element, it being understood that, in principle, any number of switch elements may be contained in a single assembly.

An electromagnetic coil that surrounds the internal elements for operating the switch is conceptually shown at 100 of FIG. 1. A base member 102 supports and partially aligns optical fibers that enter the assembly. On the right-hand side, a switchable fiber 104 enters the assembly and extends inwardly to the point 106. All but a small most inward portion 108 of the switchable fiber 104 in the assembly is enclosed in a protective sheath 110. The sheath is removed at portion 108 to facilitate optical connection with one of the fixed fibers 112 or 114 which enter the assembly from the left-hand side. The fixed fibers are also protected by sheaths 116 and 118 for part of the distance that the fibers extend into the assembly. The remaining portions 120 and 122 of the fixed fibers are unsheathed.

For the assembly to accept both sheathed and unsheathed portions of the fibers requires grooves with different dimensions along different portions of the grooves in the internal supporting surface of the base member 102. These grooves are referred to as multidimensional in this description. In FIG. 1, different dimensional sections of a vee groove are illustrated at 124 and 126, for example. The portion of the groove 124 supports the sheathed part of one of the fixed fibers 118 and is wider as well as deeper than that at 126, for example, which supports only the glass fiber itself. The cross-sectional view at 2—2 shown in FIG. 2 illustrates the vee grooves and their relation to the sheathed and unsheathed portions of the fibers more clearly. Notice that a fiber is contained entirely within its vee groove without extending above the groove. Portions of the sheathed and unsheathed fibers are glued into the grooves to provide strain support and rotational stability of the fibers. This is discussed in more detail below. A method of etching the multidimensional grooves is also discussed below.

A covering member 128 is placed over the most outward portion of the switchable fiber 104 in mating contact with the internal surface of base member 102. Similarly, a covering member 130 protects the most outward portions of fixed fibers 112 and 114. Since there is only a single incoming switchable fiber for a single switch element in the disclosed embodiment, no groove is required in member 128 to accept fiber 104. The surface of member 128 at 131 is therefore flat. A large groove 132 is etched in cover member 128 to allow space for the switchable fiber 104 to operate between its switched and nonswitched positions. The dimensions of groove 132 are not critical; unimpeded operation of fiber 104 is all that is required. Cover member 130 accepts and aligns fiber 112. It therefore contains a groove identical to that of the base member 102 which supports fiber 114.

Located on top of cover member 130 is a ferromagnetic strip 134 in overlapping configuration with a similar strip 136 glued on the upper part of the sheath of switchable fiber 104. Preferably, these strips are made of permalloy. An alternative approach to the use of strip 136 is to replace the sheath in this area of fiber 104 with a magnetic coating. The arrangement discussed so far, including strips 134 and 136, is sufficient to cause operation of the switch when a current of approximately 12 milliamperes is applied to coil 100. However, it has been found that by adding a second magnetic strip 138 located on cover member 128 in overlapping configuration with the other end of strip 136, a current of only approximately 7 milliamperes is required for operation. When operated, the cover member 130 acts as a stop for the switchable fiber. This provides accurate alignment of the switchable fiber 104 and the fixed fiber 112.

When current is removed from coil 100, the resiliency of switchable fiber 104 is sufficient to return the fiber to its idle position in optical connection with fiber 114. However, preferably a permanent magnet 140 is located on the outside surface of base member 102. This magnet aids the lock-in alignment of fibers 104 with 114 and reduces fiber bounce from approximately 20 milliseconds to about 4 milliseconds. The base member acts as a stop for the switchable fiber 104 in this idle position.

With reference now primarily to FIG. 3, during assembly of the switch, the optical fibers are inserted into their respective grooves with the internal ends of the fibers aligned with marks 142 located on the inside surfaces of base member 102 and cover member 130. The marks are etched onto the inside surface of the respective member during fabrication of the member. Glue is applied to the exposed fiber sheaths in the area of 124 and 144 on the base member 102 and 146 of cover member 130. The glue flows and wets the entire sheath in these areas. For the fixed fibers, the glue also wets the exposed glass in areas 126 and 148. This secures the glass to base member 102 and cover member 130 giving the glass inside the sheaths of the fixed fibers additionally stability. Stability of the glass of the switchable fiber is not a problem because magnetic fields secure the switchable fiber firmly in its switch positions. Glue stops 150, 152 and 154 prevent the glue from wetting the fibers any further. These glue stops are larger dimensional portions of the vee grooves that act as glue reservoirs. The cover members 128 and 130 are now assembled to the base member 102. For this purpose, base member 102 and cover member 130 are each provided with a recess 156 and 158, respectively. These recesses are etched into the members in the shape of a four-sided pyramid. A small ball bearing is inserted into the recesses for alignment of the two members in the longitudinal and traverse directions. Alignment of cover member 128 with respect to base member 102 is not critical and no such recesses have been provided.

It has been found that the above-described arrangements are sufficient for alignment of the fibers and members to allow the use of single mode fiber. However, as an added measure should the need arise, longitudinal aligning grooves 160, 162 and 164 are provided in the members. These are small aligned grooves in the base and cover members that accept approximately half of the diameter of a small fiber for traverse alignment of the members.

Figure 4:
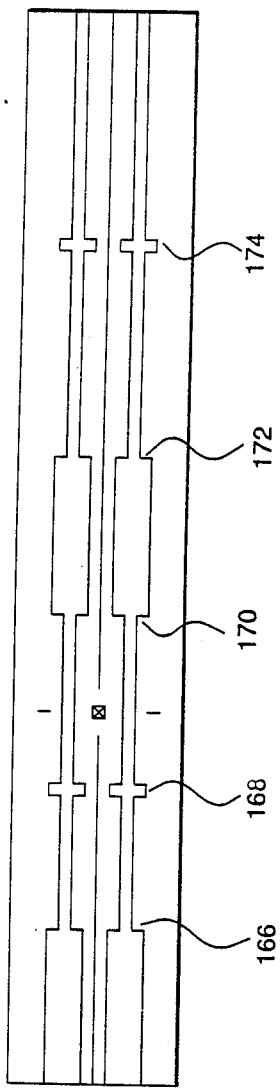
FIG. 4 shows the internal surface of the base member before final etching for achieving the multidimensional vee grooves.

A method of producing the multidimensional grooves in the base and cover members is now described. This method is described in more detail in co-pending U.S. application "Method of Micromachining Monocrystalline Structures", by R. T. Kraetsch and R. J. Pimpinella having Ser. No. 227,221. Due to the small size of the vee grooves in the switch design, it is not possible to create the different widths and depths required for the different sections of the grooves by the known technique of corner compensation with sacrificial silicon. In silicon cut along the crystallographic 100 plane, a pattern of any configuration will etch to a rectangle equal to the largest X and Y dimensions of the pattern if etched long enough. This is the process which results in destructive corner etching and for which corner compensation is conventionally applied. However, here corner etching is used to advantage. An initial etch pattern for the different dimensional sections of a groove is designed such that when a substrate with the initial pattern is etched for a predetermined period of time, the desired groove sections are created as a result of corner etching. Cross-sectional scale drawings are first used to determine the etch depth required at each different section of a groove. Then, using a top view scale drawing of the desired final pattern, the larger-sized groove sections are scaled back according to a depth versus horizontal etch rate to an initial mask design. Using this technique, the initial etch pattern for base member 102 is shown in FIG. 4. For an etch depth of 12 microns, the groove pattern corners at 166 will etch to the right 40 mils to form groove portion 124 in FIG. 3. Similarly, the corners at 168 will etch 40 mils to the left and to the right to form glue stop 152 in FIG. 3. Corners at 170 will etch left and corners 172 will etch right 40 mils to form groove 145 in FIG. 3. The corners at 174 will etch in both directions to form glue stop 154. The cover member 130 is produced in a similar manner. The initial pattern is aligned on the substrate so that the groove patterns are parallel within ½ of a degree to the flat (the 110 crystallographic plane). This prevents steps from being etched into the groove walls. The pattern is exposed with a standard positive photoresist over 2 microns of thermal $SiO_2$. The underside of the substrate wafer must also be resist protected. After oxide etching and resist stripping, the wafer is etched in 90° C. 20% KOH for about 2 hours, until the required depth and linear etch sizing have been reached. The wafer is stripped of the masking oxide and reoxidized so that the exposed silicon in the groove, where the fiber will rest, is coated with oxide.

It is understood that the above-described arrangements are merely illustrative of the application of principles of the invention and that other arrangements may be devised by workers skilled in the art without departing from the spirit and scope of the invention.

We claim:

1. An optical fiber switch assembly comprising a fixed optical fiber (114), a switchable optical fiber (104), a base member (102) having an optical fiber groove extending longitudinally from one side of the base member to the opposite side and having a first section for supporting the fixed optical fiber and a second section for supporting the switchable optical fiber in optical alignment with the fixed fiber, being characterized in that the first and second groove sections each contain a first portion (124, 144) for fixedly supporting a sheathed part of its respective fiber and a second portion (108, 109) of dimensions smaller than the first portion for supporting an unsheathed end part of its fiber and optically aligning the unsheathed end part with that of the other fiber, and means (100, 134, 136, 138) for moving at least the unsheathed end part of the switchable fiber to a position of optical disconnection, with the fixed fiber.

2. The assembly of claim 1 wherein the second groove section supporting the switchable fiber further comprises a third portion located between the first and second portions, having a length relatively long in comparison with the distance traversed by the end of the switchable fiber between its positions of optical connection and disconnection and being of traverse dimension such that no part of the switchable fiber touches the third portion of the second groove section.

3. The assembly of claim 1 further comprising first aligning means (142) on the base member for longitudinally positioning the fixed and switchable fibers in the groove in the base member, means (128, 130) mating with the base member for covering at least part of the sheathed portions of the fibers, and means (156, 158) for positioning the covering means precisely with respect to the base member.

4. The assembly of claim 3 wherein the covering means further comprises a first covering member (128) for covering at least part of the sheathed portion of the switchable fiber where it enters the assembly and a second covering member (130) for covering at least part of the sheathed portion of the fixed fiber where it enters the assembly.

5. The assembly of claim 4 wherein the first covering member contains a groove (132) of dimensions sufficient to allow unimpeded switching operation of the switchable fiber.

6. The assembly of claim 4 wherein the second covering member further comprises a longitudinal groove for supporting and aligning a second fixed fiber (112) for optical connection with the switchable fiber when it is in a switched state and further containing second aligning means (142) for longitudinally positioning the second fixed fiber in the groove in the second covering member.

7. The assembly of claim 6 wherein the groove of the second covering member contains a first longitudinal portion (146) for fixedly supporting a sheathed part of the second fixed fiber, a second portion (149) of smaller dimensions than its first portion for supporting an unsheathed end part of the second fixed fiber and a third portion of same dimensions as the second portion for supporting the unsheathed end part of the switchable fiber and for optically aligning the unsheathed end parts of the second fixed fiber and the switchable fiber when the switchable fiber is in a switched state.

8. The assembly of claim 7 wherein glue fixes the sheathed parts of the switchable fiber and the sheathed parts of the first and second fixed fibers into their respective first portions of the grooves in the base member and second covering member.

9. The assembly of claim 8 wherein both the first and second sections of the base member groove and the groove of the second covering member contain a third groove portion (150, 152) located between the first and second portions, the third portion being of a larger dimension than the first portion for halting the flow of glue toward the end face of the respective fiber.

10. The assembly of claim 6 wherein the first and second aligning means comprises a mark etched into the respective member.

11. The assembly of claim 3 wherein the positioning means further comprise a recess (156, 158) in the mating surfaces of the base member and the covering means for accepting a ball bearing residing partially in both recesses.

12. The assembly of claim 11 wherein the positioning means further comprises aligning grooves (160, 162, 164) in the base member and the covering means running parallel to the optical fiber groove in the mating surfaces of the base member and the covering means for accepting an aligning fiber residing partially in the aligning grooves of the base member and the covering means.

13. The assembly of claim 1 or claim 12 wherein all grooves are vee-shaped grooves.

14. The assembly of claim 3 or claim 12 wherein the base member and the covering means are made of silicon.

15. The assembly of claim 3 wherein the means for moving the switchable fiber further comprising
    ferromagnetic material (136) located on the movable part of the switchable fiber,
    a ferromagnetic member (134) located on the covering means in overlapping configuration with the ferromagnetic material on the switchable fiber in proximity to its end face, and
    a coil (100) surrounding the base member and covering means.

16. The assembly of claim 15 further comprising a second ferromagnetic member (138) located on the covering means in overlapping configuration with the ferromagnetic material on the switchable fiber in proximity to the fixed part of the switchable fiber.

17. The assembly of claim 16 further comprising a magnet (140) located on the outside of the base member in overlapping configuration with the ferromagnetic material on the switchable fiber.

* * * * *